Sept. 22, 1931.   F. M. REID ET AL   1,824,369
VEHICLE FOR TRANSPORTING AUTOMOBILES OR THE LIKE
Filed May 12, 1928   3 Sheets-Sheet 1
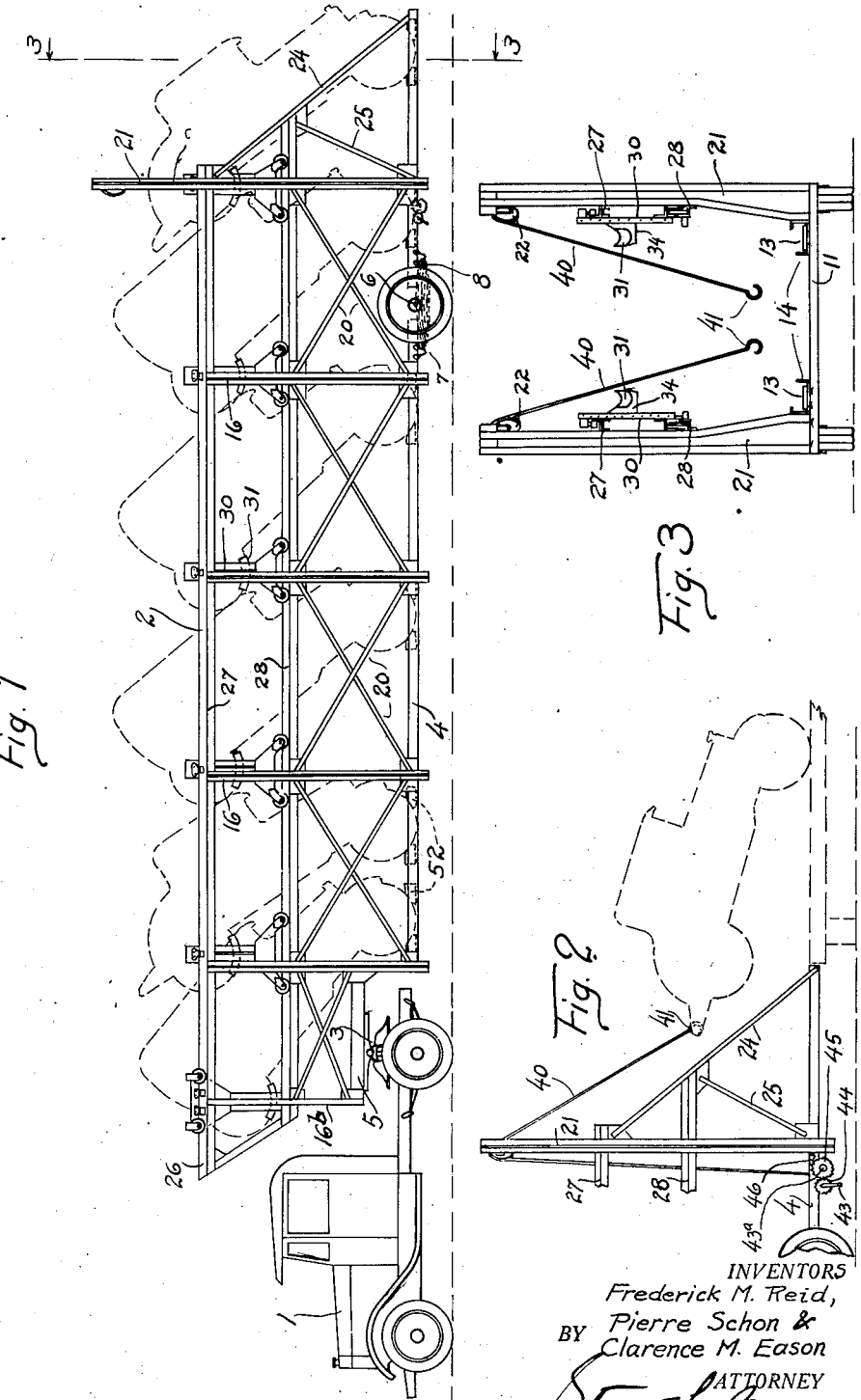
INVENTORS
Frederick M. Reid,
Pierre Schon &
BY Clarence M. Eason
ATTORNEY Sept. 22, 1931.     F. M. REID ET AL     1,824,369
VEHICLE FOR TRANSPORTING AUTOMOBILES OR THE LIKE
Filed May 12, 1928     3 Sheets-Sheet 2
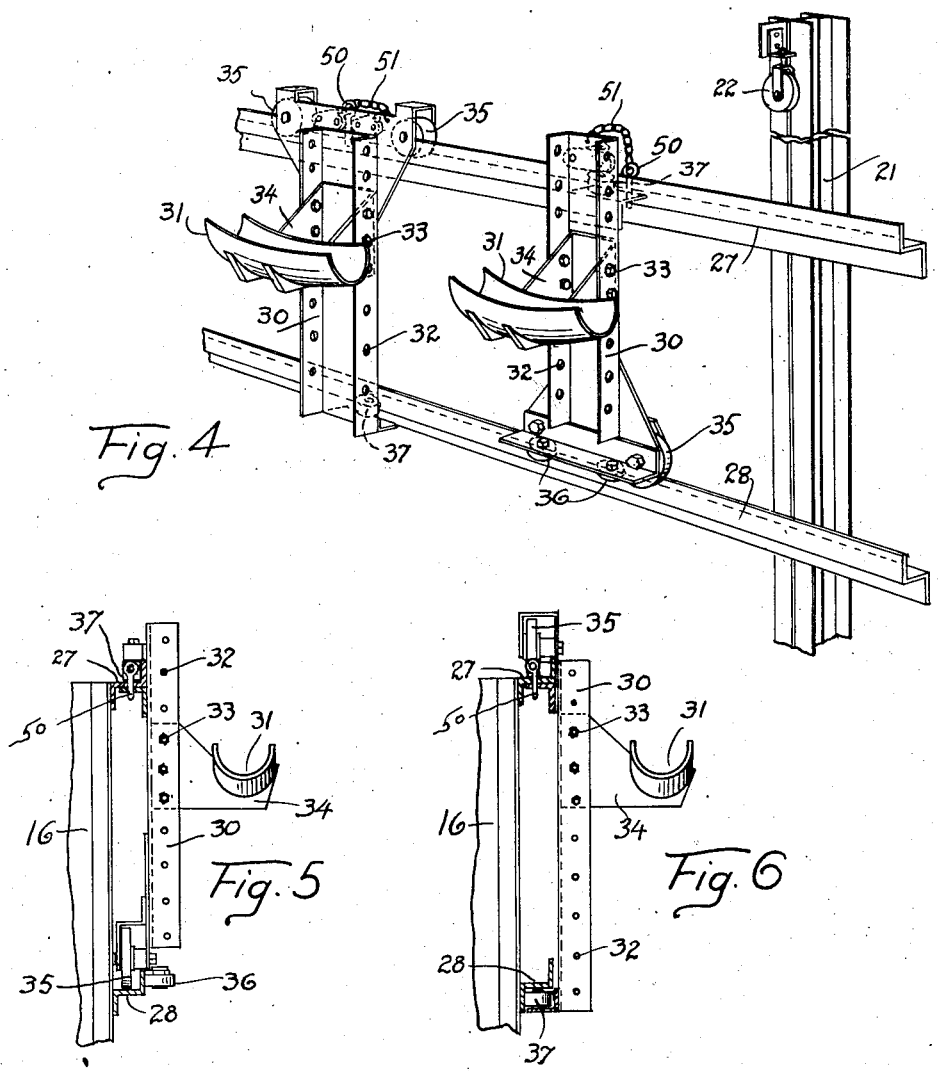
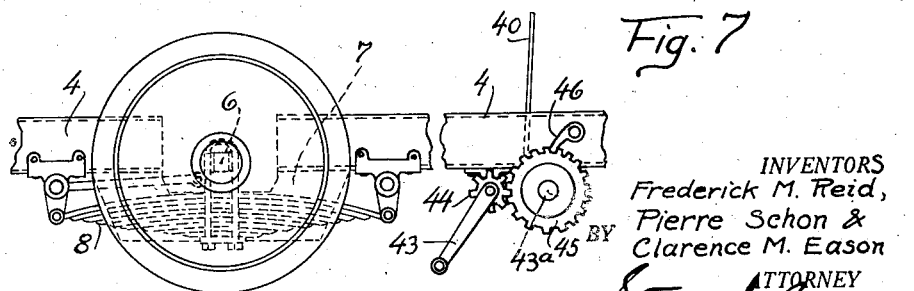
INVENTORS
Frederick M. Reid,
Pierre Schon &
Clarence M. Eason Sept. 22, 1931. F. M. REID ET AL 1,824,369
VEHICLE FOR TRANSPORTING AUTOMOBILES OR THE LIKE
Filed May 12, 1928 3 Sheets-Sheet 3
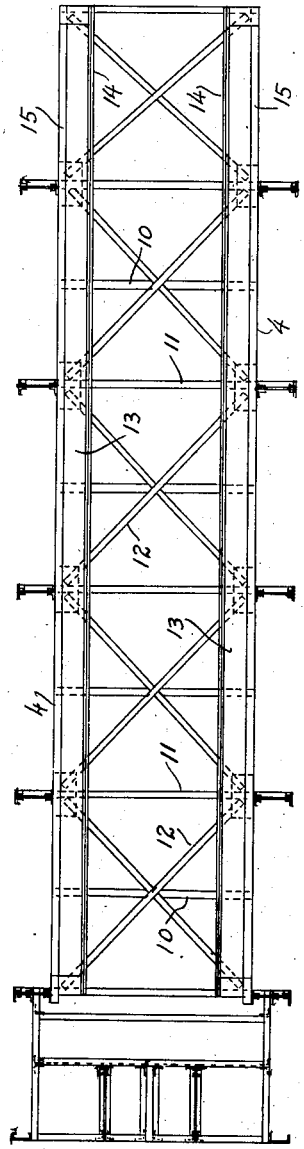
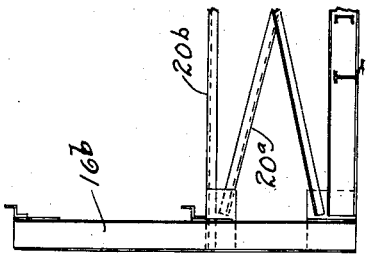
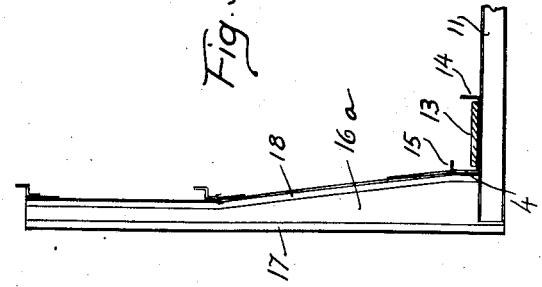
INVENTORS
Frederick M. Reid,
BY Pierre Schon &
Clarence M. Eason
ATTORNEY.

Patented Sept. 22, 1931

1,824,369

UNITED STATES PATENT OFFICE

FREDERICK M. REID, PIERRE SCHON, AND CLARENCE M. EASON, OF DETROIT, MICHIGAN, ASSIGNORS TO FRUEHAUF TRAILER COMPANY, OF DETROIT, MICHIGAN, A CORPORATION OF MICHIGAN

VEHICLE FOR TRANSPORTING AUTOMOBILES OR THE LIKE

Application filed May 12, 1928. Serial No. 277,196.

This invention relates to a vehicle for transporting automobiles or the like, which is useful for the purpose of transporting a plurality of automobiles.

It has been the practice to make deliveries of new automobiles to points, within a reasonable driving range, by driving the new automobiles under their own power. There are objections to this system, some of which are as follows: It is not economical because it requires a driver for each car; the new car becomes dirty and soiled, especially in bad weather; it is not a rapid system because of the slow rate of speed at which new cars must be driven. Some times it is arranged to tow one new automobile with another, and while this makes possible the transporting of two cars by one operator, it places an undue strain upon the towing car.

The present invention is directed toward the provision of a vehicle of sufficient size to carry a plurality of automobiles. Preferably this vehicle is articulated, being in the form of a power unit and trailer unit joined together by a fifth wheel. The trailer unit is constructed in a manner to receive a plurality of automobiles and for holding the automobiles, while being transported, in overlapped position for the purpose of getting a large number of automobiles in the carry-all. It is preferable that the tractor unit be independent of carrying an automobile or automobiles except insofar as it supports the weight of the trailer unit. The structural arrangement of the trailer unit is preferably such as to provide for disposing one or more automobiles above the tractor, and over the fifth wheel connections between the tractor and trailer unit, so as to use all available space.

There are a number of problems which present themselves in providing a vehicle of this character which are met with by certain details of construction, as will readily appear as the description progresses. One problem which is worthy of note at this time, is that of keeping within the limit of over-all height. Many States, by law, limit the height of road vehicles, and besides there are times when subways or tunnels are encountered. In order to overlap the automobiles they are mounted in a slanting position and it will be readily appreciated that varying wheel bases of the cars and various body designs bear directly upon the overall height problem. For example, a closed body of the closed sedan type is higher than the body of the open roadster. Moreover, the over-all length of road-vehicles are limited by law in many States and the problem is to keep within these limits and at the same time provide for carrying a sufficient number of automobiles in a single vehicle to make the system successful from a practical standpoint.

In the accompanying drawings:

Fig. 1 is a side elevational view of the carry-all constructed in accordance with the invention.

Fig. 2 is a diagrammatical view illustrating the manner in which an automobile is loaded on the carry-all.

Fig. 3 is a rear end view of the vehicle looking substantially on line 3—3 of Fig. 1.

Fig. 4 is a detailed perspective view illustrating the frame construction and the manner in which the automobile supports are held thereon.

Fig. 5 is a sectional view taken through one side of the frame showing an automobile supporting device.

Fig. 6 is a similar view illustrating one of the automobile supporting devices adapted to support the forwardmost automobile.

Fig. 7 is a detail illustrating the frame construction of the trailer vehicle and the lifting mechanism for loading automobiles.

Fig. 8 is a plan view illustrating the construction of the platform of a trailer unit.

Fig. 9 is a detail illustrating one of the upright members, and showing its construction.

Fig. 10 is a front end view illustrating how the side frames can be connected at the forward end.

This vehicle is shown as consisting of a tractor or power unit 1, and a trailer unit 2 connected together, as at 3, by a fifth wheel construction which is well known to those versed in the art. This fifth wheel may be of the permanently attached type, wherein the trailer unit and tractor unit are connected together and designed to remain so connected over a long period of time, or it may be of the readily separable type wherein one tractor unit may be used with two or more trailer units and the connections between the units readily made or broken. The term "fifth wheel" is used in the specification and claims in a broad sense, and is to include any swivel connection suitable for the purpose.

The frame of the trailer unit comprises longitudinally extending frame members 4 with an elevated frame part 5, at the forward end, which rests upon the tractor thus effecting a drop frame construction. This construction makes possible the lowering of the frame of the trailer in general so as to keep the center of gravity as low as possible. Referring to Fig. 7, it will be noted that the frame members 4 are positioned at about a point which causes them to intersect with the rear axle 6. The frame members 4, however, are provided with a drop construction 7 which passes underneath the axle in U-form. Rear springs 8 are suspended or underslung on the axle and are connected to the frame members as shown. Preferably these rear springs are constructed with a reverse camber, as clearly shown in Fig. 7 for the purpose of keeping the center of gravity as low as possible, and for permitting a low frame construction.

By referring to Fig. 8 the construction of the platform will be seen. The platform may advantageously be of open construction or of skeleton form, having cross members 10 and 11 positioned at points along its length and extending transversely across the frame with the members 11 projecting out from the sides of the frame for a purpose that will presently appear. Suitable diagonal brace members 12 can be used. Runways 13 are provided, one on each side of the frame, for the wheels of the automobiles. As shown in Fig. 3, these runways may be planks guarded on one side by suitable means, as for example, angle iron 14, and on the other side by channel 15.

On each side of the trailer there is a side wall frame construction which may advantageously be of open construction much after the manner of the platform of the trailer. These side walls are arranged so as to have considerable strength for remaining in a vertical position without being tied together along their length inasmuch as any cross members would interfere with the loading of the automobiles. Accordingly, each cross member 11 at its ends carries upright members 16. These upright members are preferably of builtup I-beam construction consisting of a central plate 16a disposed between angle members 17 and 18, two at each side of the plate, for forming a construction in the nature of an I-beam in cross section. Referring to Fig. 9 it will be noted that the plate and inside angle members 18 slant inwardly of the trailer body.

This provides for a relatively wide base for the uprights with a narrower construction of the upright near its upper end. This upright is securely riveted or bolted to the cross piece 11. The several uprights are tied together as by means of suitable cross rods 20. The upright positioned at the front end of the trailer, as referenced 16b, comes down only as far as the portion 5 of the trailer frame. At the rear end of the frame and on each side is an upright 21, which in construction can be the same as the uprights 16, but which is higher and provided each with a pulley 22. It will be understood that this frame construction is the same on both sides of the vehicle.

These side frames are capable of standing in position without being tied together inasmuch as any cross ties would interfere with the loading and unloading of the automobiles. However, it is preferable to tie them together at the forward end by means of suitable cross ties, as shown at 20a and 20b, as these cross members will not interfere in any way with such loading and unloading. Moreover, it is within the invention, if the same be found desirable or expedient, to use removable cross ties which can be placed in between the overlapped cars after they are loaded. These would necessarily have to be removed before unloading the vehicle.

The frame protrudes considerably beyond the rear wheels of the trailer unit for the purpose of obtaining length in the trailer unit, for the purpose of centering the weight, more or less, upon the supporting wheels. Suitable guys or braces 24 and 25 can be used for supporting this rear end. The forward end of the trailer unit, more particularly that part which rests upon and overlaps the tractor unit, extends frontward of the upright 16a as at 26 for a purpose which will soon appear.

Running lengthwise of the frame on each side of the vehicle are tracks 27 and 28, as best shown in Fig. 4. These members not only act as part of the frame construction and supports for the frame, but also form runways for moving supports of the automobiles. Accordingly, these tracks are advantageously in the form of Z-iron, as shown.

The movable automobile supporting devices mentioned above, take the form of dollies, as best shown in Figs. 4, 5, and 6. These dollies may advantageously be built up by means of a body member 30 of channel construction for carrying a shoe or pocket 31 for receiving a vehicle wheel. The channel 30 may be provided with a series of holes 32 through which bolts 33 may be inserted for securing the support 34 of the shoe thereto. Thus a shoe can be placed in various positions along the length of the channel. One end of the channel is provided with a pair of rollers 35 for resting in one of the tracks, and with one or more smaller rollers 36 turning on an axis positioned at a right angle to the axis of the rollers 35 for engaging the side of the channel. The opposite end may be provided with a single roller 37 turning on an axis the same as the axis of the rollers 36, for engaging the other tracks against side thrusts. As shown in Fig. 4, the ends of the Z tracks are open. These dollies can be rolled along the tracks and removed from the rear end of the frame.

At this point the manner in which the forward end of the trailer unit frame extends out over the truck unit, in conjunction with the manner in which the forward dolly is placed, may be advantageously explained. The vehicle is shown in Fig. 1 as being loaded with a number of cars. One set of wheels of each car is placed in the shoes of two dollies. The forwardmost dolly is positioned with its double weight supporting rollers on the top rail or track. This permits the forward car to be placed in position overlapping the truck as far as possible. The dollies for the remaining cars, however, are placed with their two weight supporting rollers on the lowermost track so that the greatest portion of the weight is carried on the lowermost rail.

The manner in which the automobiles are loaded into the carry-all is shown in Fig. 2. Suitable ropes or cables 40, provided with suitable hooks 41, extend over the pulleys 22, and are wound upon drums (not shown) carried by shaft 43a. The hooks are attached to the rear end of the car at any suitable place, as for example, to the rear end of the frame at about the point where the frame is secured to the springs, whereupon the cables are wound upon the drum through the means of the handle 43 and gear 44, intermeshing with the gear 45, the gear 45 being suitably keyed to the shaft 43a. A pawl 46 may be used in conjunction with the gear 45. As the cables are wound up the automobile is raised, as illustrated, and when in proper position its rear wheels are placed in the pockets of the dollies, one dolly on each side of the frame.

It will be understood that prior to loading the trailer, all of the dollies are removed except perhaps the forward dollies. This car is then pushed to the front end of the trailer. Due to the fact that the forwardmost dolly is reversed in position as regards the other dollies, the forwardmost car can overlap the power unit a relatively great distance. This overlapping, as stated above, is also facilitated by the forward projection of the frame. Another pair of dollies are then placed on the tracks and another car is raised with its wheels then placed in the pockets, and this car is moved back in overlapping position as regards the first one, the front wheels of the car roll along the planks on the floor of the trailer. Succeeding cars are then similarly loaded. The unloading of the vehicles is accomplished by just the reverse of these operations.

Preferably the uprights are positioned at points along the length of the vehicle so that each pair of dollies supporting the wheels of an automobile lie in close proximity to a set of uprights in order that the weight may be carried substantially directly by the supports. There will be, of course, some variation in the positions of the dollies in different loads, depending upon the body style and wheel base of the particular automobile, but this variation will not result in positioning the dollies a material distance away from the uprights.

It is preferable to elevate the rear end of the automobiles when loading them in this manner. In the first place, the front end of an automobile is the heaviest when it is empty by reason of the engine being at the front end, and thus the center of gravity is maintained lower than it would be if the front end of the car were elevated. Moreover, when the cars are thus elevated at one end there may be a dripping of oil from the engine, and by elevating the rear ends the oil which drips does not fall upon the next adjacent car.

It will be noted, that due to the different shapes of bodies some cars can be elevated more than others; for example, the second car from the front, as shown in Fig. 1, has a body which in design, is commonly termed a coupe, and this car can be elevated much more than the forwardmost car which has a body in design commonly termed a sedan, and yet the over-all height is not increased. This variation is taken care of by the fact that the wheel supporting shoes are adjustable on the dollies. These adjustments need not be made frequently inasmuch as the dollies can be originally adjusted for carrying a sedan, coupe or other model and used only with this style of body. While only two body types are shown, the same principles hold true with other body types of both open and closed models.

Suitable locking means can be provided for the dollies when the cars are properly positioned, and this may take the form of a bolt 50 which may be held to the dollies by chain 51, and which can be inserted through suitable openings in the tracks. Also it is preferable to block the front wheels of the automobiles on the planks, and for this purpose suitable chock blocks 52 can be utilized.

Claims:

1. A vehicle for transporting automobiles or the like, comprising in combination, a tractor, a semi-trailer, a fifth wheel connection between the tractor and the forward end of the semitrailer, whereby the tractor supports this end of the semi-trailer, supporting wheels for the other end of the semi-trailer, a side frame on each side of the semi-trailer, means on the frames for supporting one or more automobiles with one end elevated and the automobiles in inclined position, said frames extending forwardly of the said fifth wheel connection whereby the elevated end of the forwardmost automobile materially overlaps the tractor.

2. A vehicle for transporting automobiles of the like comprising in combination, a tractor provided with a driver's cab and rear driving wheels, a semi-trailer, a fifth wheel connection between the rear end of the tractor and the forward end of the semi-trailer, supporting wheels for the rear end of the semi-trailer, a frame on each side of the semi-trailer running lengthwise thereof, means on the frame for supporting one or more automobiles with one end elevated, said frames extending forwardly and terminating in close proximity to the driver's cab whereby the forwardmost automobile materially overlaps the tractor with its elevated end supported in close proximity to the driver's cab so that substantially all available space at the rear of the driver's cab on the tractor is utilized.

3. A vehicle for transporting automobiles or the like comprising in combination, a tractor provided with a driver's cab and rear driving wheels, a semi-trailer, a fifth wheel connection between the rear end of the tractor and the forward end of the semi-trailer, supporting wheels for the rear end of the semi-trailer, means on the trailer positioned forwardly of the fifth wheel and in close proximity to the driver's cab and supporting an automobile with one end elevated so that the elevated end thereof is in close proximity to the driver's cab whereby all available space to the rear of the driver's cab on the tractor is utilized.

4. A vehicle for transporting automobiles or the like comprising a platform, side walls running lengthwise of the platform, movable means carried by the side walls for supporting one end of an automobile in elevated position, said means being movable along the side walls whereby an automobile can first be elevated at one end and then moved to proper position on the vehicle.

5. A vehicle for transporting automobiles or the like comprising a platform, side walls running lengthwise of the platform, means on the side walls for supporting one end of an automobile in elevated position, said means being movable along the side walls whereby an automobile can first be elevated at one end and then moved to proper position on the vehicle, and means on the platform along which the wheels at the other end of the automobile may roll.

6. A vehicle for transporting automobiles or the like comprising, a vehicle frame, side walls on the frame, a track device running lengthwise of each side wall, and movable means supported by the track devices for in turn supporting one end of an automobile in elevated position whereby an automobile may first be elevated at the rear end of the vehicle and then positioned in the vehicle while so elevated.

7. A vehicle for transporting automobiles or the like comprising, a vehicle frame, side walls on the frame, a track device running lengthwise of each side wall, means supported by the track devices for in turn supporting one end of an automobile in elevated position whereby an automobile may first be elevated at the rear end of the vehicle and then positioned in the vehicle while so elevated, and means on the platform along which the wheels at the other end of the vehicle may roll during the positioning on the vehicle.

8. A vehicle for transporting automobiles or the like comprising, a vehicle platform, side frames carried by the platform, a track device on each side frame, a plurality of dollies including rollers mounted for movement on the track devices, means on each dolly for supporting one end of an automobile in elevated position, and means on the platform for supporting the other end of the automobiles, whereby an automobile may be first elevated and then moved to proper position in the vehicle.

9. A vehicle for transporting automobiles or the like comprising, a platform, side frames on the platform, a track device carried by each side frame and disposed lengthwise thereof, a plurality of dollies supported by the track devices and movable along the track devices, means on each dolly for supporting the wheels at one end of the automobiles, with the wheels at the other end resting upon the platform, and means for locking the dollies in position on the track devices.

10. A vehicle for transporting automobiles or the like comprising, a platform, side frames on the platform, a track device carried by each side frame and disposed lengthwise thereof, a plurality of dollies supported by the track devices and movable along the track devices, means on each dolly for supporting the wheels at one end of the automobiles, with the wheels at the other end resting upon the platform, and means for locking the dollies in position on the track devices, said track devices and dollies being elevated with respect to the platform whereby the automobiles are disposed in angular position with one end elevated.

11. A vehicle for transporting automobiles or the like comprising, a platform, side frames on the platform, a track device carried by each side frame and disposed lengthwise thereof, a plurality of dollies supported by the track devices and movable along the track devices, means on each dolly for supporting the wheels at one end of the automobiles, with the wheels at the other end resting upon the platform, and means for locking the dollies in position on the track devices, said track devices and dollies being elevated with respect to the platform whereby the automobiles are disposed in angular position with one end elevated, said wheel supporting means on the dolly being adjustable on the dolly whereby automobiles of varying types can be elevated to varying heights.

12. A vehicle for transporting automobiles or the like, comprising a platform, side frames, a track device on each side of the frame, dollies carried by the track devices, means on the dollies for supporting one end of an automobile in elevated position, said means being adjustable so that the automobiles can be elevated to varying heights in order to accommodate for limitations in overall height requirements.

13. A vehicle for transporting automobiles or the like comprising a platform, side frames on the platform, a track device on each side frame elevated with respect to the platform, dollies carried by the track devices for supporting one end of an automobile in elevated position, and means for elevating one end of an automobile for placement on the dollies.

14. A vehicle for transporting automobiles or the like comprising a platform, side frames on the platform, a track device on each side frame elevated with respect to the platform, dollies carried by the track devices for supporting one end of an automobile in elevated position, and means at the rear end of the vehicle for elevating one end of an automobile for placement on the dollies, said dollies being movable on the track devices whereby an elevated automobile can be moved forwardly between the side frames into proper transporting position.

15. A vehicle for transporting automobiles or the like comprising, a platform, side frames on the platform, a track device carried by each side frame including an upper rail and a lower rail, a plurality of dollies carried by the rails, and movable along the rails, for supporting automobiles elevated at one end, the majority of said dollies having weight supporting rollers on the lower rail whereby the majority of the weight of the automobiles is carried at a point below the top of the side frames.

16. A vehicle for transporting automobiles or the like comprising a tractor, a semi-trailer including a platform, side frames on the platform, a track device on each side frame including an upper rail and a rail positioned intermediate of its height, a plurality of dollies rollable along the tracks for supporting automobiles with one end elevated, said dollies having spaced weight-supporting rollers positioned on the said intermediate rail, the top rail extending forwardly over the tractor a distance greater than which the intermediate rail is permitted to extend over the tractor, and the forwardmost dolly having its said weight-supporting rollers positioned on the top rail whereby the forwardmost car can be positioned so as to materially overlap the tractor, whereby all available space over the tractor is utilized.

17. A vehicle for transporting automobiles or the like comprising a platform, a side frame construction on each side of the platform, a track device on each frame, dollies on the track devices for supporting automobiles with one end elevated, said side frames including an upright member at the rear end which extends higher than the side frames, means associated with these uprights for elevating one end of an automobile for placement on dollies.

18. A vehicle for transporting automobiles or the like comprising a platform, a side frame construction on each side of the platform, a track device on each frame, dollies on the track devices for supporting automobiles with one end elevated, said side frames including an upright member at the rear end which extends higher than the side frames, means associated with these uprights for elevating one end of an automobile for placement on dollies, whereby the elevated automobile may then be rolled forwardly into the vehicle, and said side frames, including other upright members, positioned approximately at the points where the dollies are to be located during the transportation of automobiles carried by the vehicle.

19. A vehicle for transporting automobiles or the like comprising a vehicle frame, side walls on the frame, means for holding a plurality of automobiles each elevated at one end with the automobiles overlapping each other, means for initially elevating the automobiles at one end of the frame, so that the automobiles can then move in between the side walls to proper positions for transportation, said side walls being constructed so as to stand in vertical position and support the weight required of them independently of any connection between them.

20. A vehicle for transporting automobiles or the like comprising a vehicle frame, side walls on the frame, means for holding a plurality of automobiles each elevated at one end with the automobiles overlapping each other, means for initially elevating the automobiles at one end of the frame, so that the automobiles can then move in between the side walls to proper positions for transportation, said side walls being constructed so as to stand in vertical position and support the weight required of them independently of any connection between them, and means for connecting the side walls at the forward end.

21. The method of loading automobiles or the like on a vehicle for transportation, which comprises elevating one end of an automobile, holding the automobile in this elevated position, moving the automobile while so elevated into proper transporting position in the vehicle, and repeating these operations on successive automobiles until a plurality of automobiles each elevated at one end, and disposed in overlapped position are disposed in transporting position on the vehicle.

In testimony whereof we affix our signatures.

FREDERICK M. REID.
PIERRE SCHON.
CLARENCE M. EASON.